United States Patent [19]
Sugahara et al.

[11] Patent Number: 6,084,636
[45] Date of Patent: Jul. 4, 2000

[54] VIDEO SIGNAL ENCODING METHOD AND APPARATUS EMPLOYING AN ADAPTIVE QUANTIZATION TECHNIQUE

[75] Inventors: Takayuki Sugahara; Motoharu Ueda; Hiroshi Nakagawa; Masayoshi Nishitani; Mitsuaki Fujiwara, all of Kanagawa-ken, Japan

[73] Assignee: Victor Company of Japan, Ltd., Yokohama, Japan

[21] Appl. No.: 08/937,636

[22] Filed: Sep. 25, 1997

[30] Foreign Application Priority Data

Sep. 27, 1996 [JP] Japan ................................ 8-256053

[51] Int. Cl.⁷ ............................... H04N 7/36; H04N 7/50
[52] U.S. Cl. ......................... 348/405; 348/419; 382/251
[58] Field of Search .................... 348/405, 419; 382/251; H04N 7/36, 7/50

[56] References Cited

U.S. PATENT DOCUMENTS

| | | | |
|---|---|---|---|
| 5,404,168 | 4/1995 | Yamada | 348/405 |
| 5,530,478 | 6/1996 | Sasaki | 348/405 |
| 5,642,165 | 6/1997 | Suzuki | 348/405 |
| 5,686,963 | 11/1997 | Uz | 348/405 |
| 5,838,826 | 11/1998 | Enari | 348/405 |
| 5,959,675 | 9/1999 | Mita | 348/405 |

FOREIGN PATENT DOCUMENTS

| | | |
|---|---|---|
| 7-284097 | 10/1995 | Japan . |
| 8-18960 | 1/1996 | Japan . |
| 8-098160 | 4/1996 | Japan . |

*Primary Examiner*—Howard Britton
*Attorney, Agent, or Firm*—Eugene Lieberstein; Michael N. Meller

[57] ABSTRACT

A method employed in an encoding apparatus allocates bits for each of the pictures and blocks of a video signal based on quantization-dependent and quantization-independent signal thereof. First, the quantization-dependent signal is quantized based on a fixed quantization parameter; and the quantized data and the quantization-independent signal are statistically coded to thereby provided first data and second data. A target amount of encoded bits for each picture and block is then determined based on a target bit rate and the respective amounts of the first and the second data. The amounts of encoded data for the pictures and the blocks are adaptively controlled according to the target amounts of encoded bits by adjustably altering quantization parameters based on the difference between the target amount of the encoded bits and the amount of the encoded data generated.

18 Claims, 7 Drawing Sheets

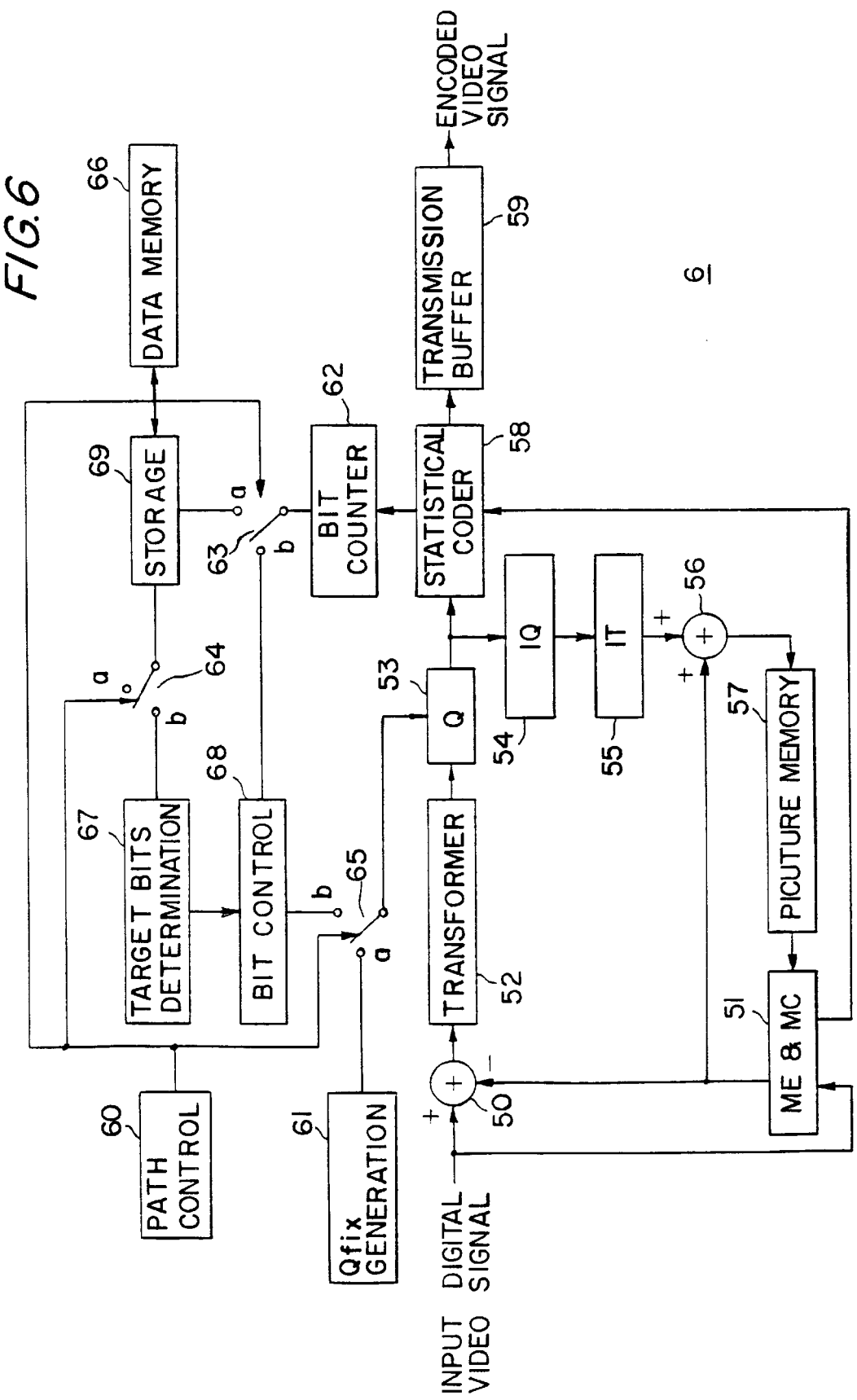

VIDEO SIGNAL ENCODING METHOD AND APPARATUS EMPLOYING AN ADAPTIVE QUANTIZATION TECHNIQUE

FIELD OF THE INVENTION

The present invention relates to a video signal encoding method and apparatus; and, more particularly, to a method and apparatus for adaptively encoding a video signal based on estimated bit distribution information by subjecting the video signal in two (i.e., first and second) encoding paths, wherein the first coding path provides the bit distribution information to be used in adjusting a quantization process in the second coding path.

DESCRIPTION OF THE PRIOR ART

There has been proposed an encoding method and apparatus for quantizing and variable length coding an input video signal in a first and a second paths based on, e.g., MPEG(motion picture expert group) standard, wherein the first path obtains bit distribution information required in the coding process carried out in a second path, the bit distribution information being obtained for each of the pictures constituting a video sequence and each of equal-sized blocks of, e.g., 16×16 pixels included in each picture(see, e.g., Japanese Patent Laid-Open Publication No. 7-284097).

In conventional video signal encoding techniques such as MPEG, the amount of encoded data increases with the complexity of a video signal and motion compensation errors if the video signal is variable length coded, especially after having been quantized with a fixed quantization parameter(Qp) or quantization step size(Qs). By taking advantage of such feature, the prior art encoding schemes examine the distribution of the encoded data or bit distribution information at the first path by using the fixed Qp; and, based thereon, allocate at the second path available bits determined within the budget of a target bit rate among pictures and blocks in order to provide uniform and high quality pictures. By allocating bits based on the distribution data among pictures, it is possible to provide a temporally uniform image quality. In a similar fashion, spatially uniform pictures can be obtained by allocating bits among the blocks in each picture.

The Qp at the first path is set to be smaller than those at the second path so that the amount of data generated at the first path is controlled to be greater than the one generated at the second path. Through the use of the Qp of a smaller magnitude at the first path, high frequency components of the video signal can be detected more thoroughly and the characteristics of the video signal can be examined more precisely, which is necessary for an efficient bit allocation at the second path.

In a typical prior art scheme, the bit allocation at the second path is controlled according to the bit distribution information from the first path and a predetermined target bit rate utilizing roughly inverse-proportional relationship between an amount of encoded data and Qp's or Qs's. In other words, distribution ratios of encoded bits for the pictures and the blocks at the second path are controlled to maintain approximately same ratios for those at the first path while maintaining the target bit rate. The control of the amount of encoded data generated at the second path is carried out by altering Qp's.

However, the amount of certain encoded data remains unchanged even though the Qp is changed. Those are supplementary or quantization-independent encoded data such as header information and motion vectors in MPEG, which are variable length coded without being quantized.

The amount of such supplementary data depends on the size of a picture. For instance, 20–50 Kbits of supplementary data are generated on the average for a picture of 720×480 pixels encoded according to a MPEG 2 scheme.

In FIGS. 7A and 7B, the amounts of data generated for each picture by the first and second paths are illustrated, respectively, wherein each bar represents the total amount of data generated for a picture and a shaded portion thereof indicates the amount of supplementary or quantization-independent data for a picture.

The ratios of the amount of quantization-independent data to the total amount of data can be different between pictures depending on the actual distribution of bits allocated thereto. For a transmission rate of 6 Mbps, the amount of quantization-independent data occupies about 20% of the total amount of data generated by the first path, as shown in FIG. 7A. Since, however, the second path encodes the video signal with a lower average transmission rate than the first path, the occupation ratio of the quantization-independent data at the second path becomes greater. For instance, the amount of quantization-independent data occupies about 30% of the total amount of data generated by the second path of a target bit rate of 4 Mbps, as shown in FIG. 7B.

Referring to FIGS. 8A and 8B, there are illustrated the amounts of encoded data generated for each block by the first and the second paths, respectively, wherein each bar represents the total amount of data generated for a block and a shaded portion thereof indicates the amount of quantization-independent data for a block. Similarly, at the first path, the occupation ratio of the supplementary data is greater than 50% of the total amount of data in certain blocks, as shown in FIG. 8A; and since the average transmission rate in the second path is controlled lower than that of the first path, the amount of supplementary data occupies in some blocks more than 70% of the total amount of data generated by the second path, as shown in FIG. 8B.

Since, however, in the conventional bit allocation scheme described above, the bit allocation is performed based on the bit distribution information determined by the total amount of encoded data including the quantization-dependent and independent data, the resultant bit allocation does not reflect the inverse proportionality of the Qp and the amount of the quantization-dependent data, resulting in a local shortage of the allocated bits at certain pictures or blocks, which may cause degradation of the image quality.

SUMMARY OF THE INVENTION

It is, therefore, an object of the present invention to provide a method and apparatus capable of improving the image quality by allocating bits without suffering the local shortage of allocated bits.

In accordance with one aspect of the present invention, there is provided a method for encoding an input video signal, the method comprising the steps of : processing the input video signal in a predetermined manner to thereby provide a processed signal, the processed signal including a quantization-dependent signal and a quantization-independent signal; quantizing the quantization-dependent signal based on a fixed Qp to thereby provide first quantized data; variable length coding the first quantized data and the quantization-independent signal to thereby provide first data and second data, respectively; storing the amount of the first data and the amount of the second data; determining a target amount of encoded bits for each unit of the video signal based on a predetermined target bit rate and the amounts of the first and the second data; quantizing the quantization-dependent signal based on one or more Qp's determined based on the target amount of encoded bits to thereby provide second quantized data; variable length coding the second quantized data and the quantization-independent signal to thereby provide encoded data, wherein the Qp's for the second quantized data are adjusted according to the difference between the target amount of encode bits and the amount of the encoded data.

A unit of the video signal for which the target amount of encoded bits is determined can be a picture and/or a block.

In accordance with another aspect and a preferred embodiment of the invention, there is provided a video signal encoding apparatus which comprises a first encoder, a storage, a delay, and a second encoder.

The first encoder includes a first signal processor for processing an input video signal in a predetermined manner to generate a processed video signal which includes a quantization-independent signal and a quantization-dependent signal, a first quantizer, a first variable length coding(VLC) circuit, and a first counter. The first quantizer quantizes the quantization-dependent signal based on a fixed Qp to thereby provide first quantized data. The first VLC circuit, then, provides first and second data by encoding, through the use of the VLC technique, the first quantized data and the quantization-independent signal, respectively. At the first counter, the amounts of the first and the second data are counted separately. The amount of the first data is dependent upon the magnitude of the Qp, while the amount of the second data is independent thereof.

The storage stores the respective amounts of the first and the second data; and the delay delays the input video signal for synchronization. In other words, the input video signal is delayed by the delay until the amounts of the first and the second data are stored in the storage, and is applied to the second encoder thereafter.

The second encoder includes a second signal processor, a target bits determination circuit, a bit controller, a second quantizer, a second VLC circuit, and a second counter. The second processor processes the delayed input video signal in the same manner as in the first processor to generate the processed video signal. The target bits determination circuit determines a target amount of encoded bits for each unit of the video signal based on a predetermined target bit rate and the respective amounts of the first and the second data. The bit controller decides one or more new Qp's for each unit based on the target amount of encoded bits. The second quantizer quantizes the quantization-dependent signal based on the newly decided Qp's to thereby provide second quantized data. Subsequently, the second VLC circuit encodes the second quantized data and the quantization-independent signal to thereby generate third data and fourth data, respectively. The second counter counts the respective amounts of the third and the fourth data; and the bit controller calculates the error between the target amount of encoded bits and the sum of the amounts of third and fourth data, thereby adaptively controlling Qs's at the second quantizer by adjusting Qp's based on the error.

In accordance with the inventive method and apparatus described above, the input video signal is quantized with the fixed Qp and variable length coded at the first encoder. Then, the variable length coded data is separately stored at the storage by the amount of first data, which is dependent on the Qp, and the amount of the second data, which is independent of the Qp. Subsequently, at the second encoder, the target amount of encoded bits is determined for each unit of the video signal based on the stored amounts of first and second data. Since the Qp's at the second encoder are adjusted based on the error between the target amount of encoded bits and the actual amount of variable length coded data generated by the second encoder such that the actual amount of encoded data gets closer to the target amount of encoded bits, the target amount of encoded bits determined by taking account of the quantization-independent second data can be optimally allocated at the second path.

In accordance with another preferred embodiment of the present invention, the video signal encoding apparatus is implemented with a reduced number of components by sharing the common parts, i.e., signal processors, quantizers, VLC circuits, and bit counters of the first and the second encoders of the first embodiment. In such an instance, the apparatus of the second embodiment is constituted to have a signal processor; a quantizer, a VLC circuit; a bit counter; a storage; a target bits determination circuit for determining the target amount of encoded bits for each unit of the video signal based on the predetermined target bit rate and the respective amounts of first and second data; a bit control circuit for determining an initial Qp based on the target amount of encoded bits and further finding the error between the target amount of encoded bits and the actual amount of variable length coded data to thereby adjustable control Qp's, which in turn adaptively alters Qs's at the quantizer; Qfix generation circuit for providing the fixed Qp; and a switching circuit.

In the configuration of the second embodiment apparatus, first the fixed Qp is applied to the quantizer by the switching circuit, thereby enabling the input video signal processed at the signal processor to be quantized by Qs's determined by the fixed Qp; and the amount of the encoded data generated is counted and stored. Thereafter, the amount of the encoded data stored is fed to the target bits determination circuit to determine the target amount of encoded bits for each unit. The target amount of encoded bits is then supplied to the bit controller wherein the Qp's are adaptively adjusted to control Qs's at the quantizer.

BRIEF DESCRIPTION OF THE DRAWINGS

The above and other objects and features of the present invention will become apparent from the following description of preferred embodiments given in conjunction with the accompanying drawings, in which:

FIG. 6 offers a block diagram of a video signal encoding apparatus in accordance with the second preferred embodiment of the present invention;

DETAILED DESCRIPTION OF THE PREFERRED EMBODIMENTS

Figure 1:
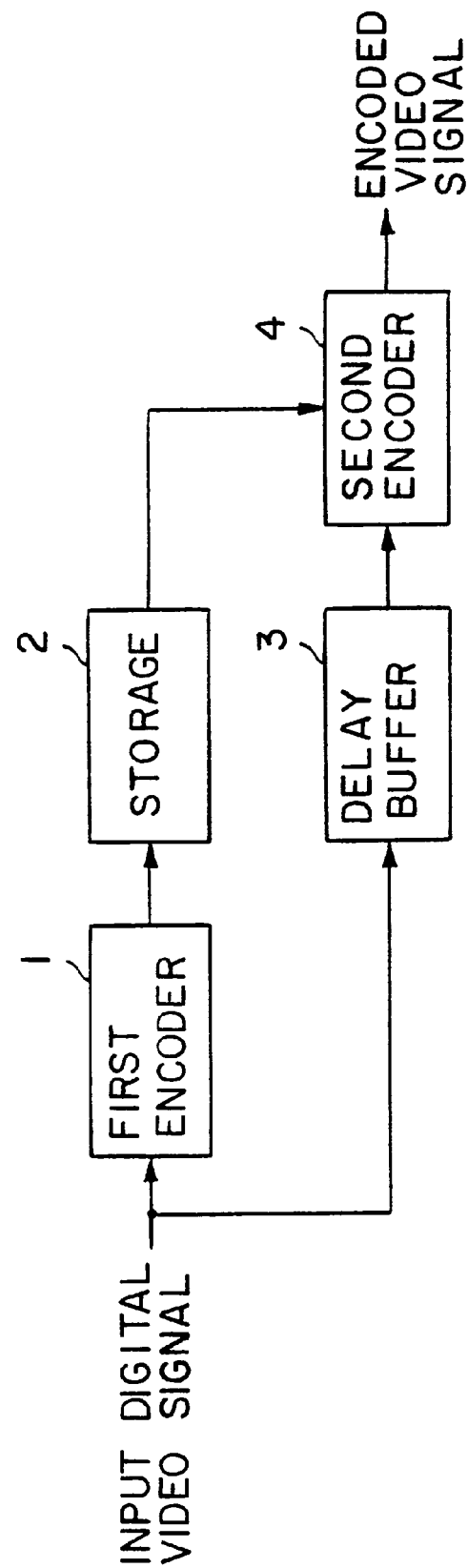
FIG. 1 shows a block diagram of a video signal encoding apparatus in accordance with the first preferred embodiment of the present invention.

Referring to FIG. 1, there is illustrated a block diagram of a video signal encoding apparatus in accordance with the first preferred embodiment of the present invention. The first preferred embodiment and other embodiments of the present invention described herein employs the MPEG encoding method.

In the MPEG, a video sequence is divided into groups of picture(GOP's). As is well known, a picture may represent either a frame or a field of the video signal; and the term "picture" is used in preference with the terms "frame" or "field" in the art. A GOP is a set of pictures which are contiguous in display order and is the smallest coding unit that can be independently decoded within a sequence. The GOP contains at least one intra-coded picture(I-picture) and any numbers of predictive coded picture(P-pictures) and bidirectionally predictive coded pictures(B-pictures). The smallest encoding unit is a block of 8×8 pixels. In a 4:2:0 format, four adjacent luminance blocks and two chrominance blocks each representing a different type of chrominance signals corresponding to the four luminance blocks form a macroblock, which is the smallest unit of the motion estimation and compensation; and a number of macroblocks make a picture or a slice. For further details of the MPEG, refer to ISO-IEC11172-2 of International Organization for Standardization(ISO) and ITU-TH. 262/ISO-IEC13818-2 of International Telecommunications Union(ITU).

Referring back to FIG. 1, an input digital video signal is fed to a first encoder 1 constituting a first path and to a delay buffer 3. At the first encoder 1, the video signal is quantized with a fixed quantization parameter(Qp) and encoded by a statistical coding technique. Subsequently, amounts of quantization-dependent data and quantization-independent data included in the encoded data for each predetermined unit of the video signal are separately counted. The counted amounts of quantization-dependent and quantization-independent data are then supplied as bit distribution information from the first encoder 1 to a storage 2 and stored therein.

The video signal is delayed by the delay buffer 3 for a certain period, which corresponds to a processing time needed for obtaining the bit distribution information and storing same at the storage 2, and fed to a second encoder 4 constituting the second path.

At the second encoder 4, a target amount of encoded bits for each picture is decided based on a target bit rate and the bit distribution information from the storage 2 through the use of an algorithm which will be described hereinafter and, subsequently, a target amount of encoded bits for each of the macroblocks included in each and every picture is determined based on the bit distribution and the target amount of encoded bits for each picture. Thereafter, the video signal from the delay buffer 3 is quantized and variable length coded by using quantization step sizes(Qs's) determined by the target amounts of encoded bits for the pictures and the macroblocks.

In determining the target amount of encoded bits for a picture, a gross target amount of encoded bits is computed first for a predetermined set of pictures, e.g., GOP, in which the picture is included, based on the target bit rate and a ratio of the number of pictures in the set with respect to the number of pictures in a unit time. The total amount of quantization-independent data for the pictures in the set is then subtracted from the gross target amount of encoded bits to thereby provide a target amount of quantization-dependent encoded bits for the set. A target amount of quantization-dependent encoded bits for the picture is calculated based on the one for the set and a ratio of an amount of quantization-dependent data for the picture which respect to a total amount of quantization-dependent data for the set. Finally the target amount of encoded bits for the picture is obtained by summing the amount of quantization-dependent data and the target amount of quantization-dependent encoded bits for the picture.

Similarly, the target amount of encoded bits for a macroblock in a picture is determined as follows. First, a target amount of quantization-dependent encoded bits for the macroblock is calculated based on the one for the picture and a ratio of an amount of quantization-dependent data for the macroblock to the one for the picture. A target amount of encoded bits for the macroblock is then calculated by adding the target amount of quantization-dependent encoded bits and an amount of the quantization-independent data for the macroblock.

As a consequence of determining target amounts of encoded bits by taking account of the quantization-independent supplementary data in accordance with the present invention, bit allocation among the pictures and macroblocks can be accomplished without suffering a local shortage of bits.

The first preferred embodiment of the present invention is described in more detail with reference to FIGS. 2 to 5.

Figure 2:
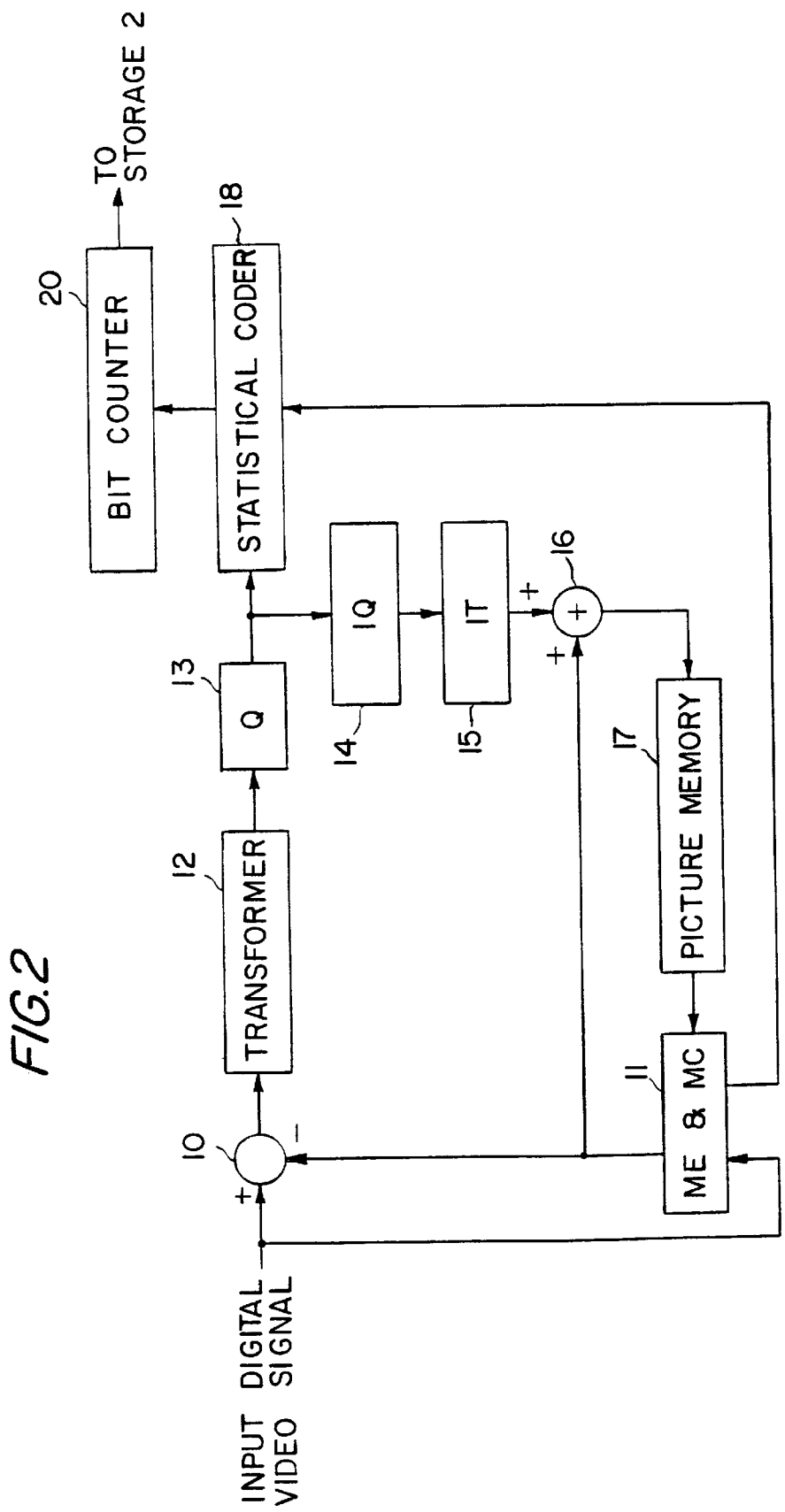
FIG. 2 presents a block diagram of a first encoder shown in FIG. 1.

Referring to FIG. 2, there are illustrated details of the first encoder 1 shown in FIG. 1. A digitized image signal including luminance and chrominance signals is reordered in an encoding order based on types of pictures in a reordering circuit(not shown). The reordered video signal is fed as an input digital video signal to a subtractor 10 and a motion estimation and motion compensation(ME & MC) circuit 11. At the subtractor 10, an error signal is generated by subtracting a motion compensated signal provided from the ME & MC circuit 11 from the input digital video signal. The error signal is then provided to a transformer 12, wherein the error signal is transformed on a block-by-block basis by using, e.g., the discrete cosine transform(DCT) technique and each block of the error signal is converted into a set of transform coefficients including a DC coefficient representing an average pixel value of the block and a plurality of, e.g., 63, AC coefficients representing high frequency components of the pixels within the block. All the transform coefficients are quantized in a subsequent encoding process, and, therefore, they are quantization-dependent.

A quantizer(Q) 13 quantizes the transform coefficients with a fixed Qp to thereby provide quantized coefficients to an inverse quantizer(IQ) 14 and a statistical coder(VLC) 18. As is well known, Qs's determining magnitudes of the quantized coefficients at the quantizer are calculated based on a Qp and a quantization matrix; and, therefore, a unique Qs is applied to an inter-block but the number of Qs's for an intra-block can be as much as 64.

Thereafter, since I-pictures and P-pictures act as reference pictures in ME&MC, the quantized coefficients corresponding thereto are inverse-quantized and subsequently inverse-transformed at the IQ 14 and an inverse transformer(IT) 15, respectively. An adder 16 adds the motion compensated signal from the ME & MC circuit 11 and the inverse transformed coefficients from the IT 15, thereby providing a reconstructed video signal, which is identical to the one decoded in a receiving end. The reconstructed video signal is then stored at a picture memory 17. It should be noted that the motion compensated signal corresponding to an I-picture or an intra-block is of a zero value.

At the ME & MC circuit 11, a motion estimation and compensation for the input digital video signal of the I- or B-picture is carried out, e.g., on a macroblock-by-macroblock basis with reference to reconstructed reference signals in the picture memory 17 through the use of a conventional motion estimation and compensation technique. Outputs of the ME & MC circuit 11 for each macroblock of the input digital video signal are a motion compensated signal to the subtractor 10 and the adder 16 and motion vector information and a prediction mode signal to the statistical coder 18. The motion vector information may include two motion vectors for a macroblock of the B-picture and the prediction mode signal represents information indicating whether the macroblock is intra-coded or inter-coded. The prediction mode signal may further include information whether the macroblock is forwardly or backwardly motion estimated in case only one motion vector is obtained for the macro-block of the B-picture. These supplementary data including the motion vector information and the prediction mode signal are not quantized, and, accordingly, the amount of encoded bits thereof is quantization-independent.

The statistical coder 18 encodes the sequentially inputted quantized coefficients from the quantizer 13 and the motion vector information and the prediction mode signal from the ME & MC circuit 11 based on, e.g., the conventional variable length coding technique, wherein a shorter codeword is assigned to input data of more frequent occurrences.

The functions and features of the components 10 to 18 described above with reference to FIG. 2 are well known in the art and described in more detail in MPEG supra, excepting that quantization of the transform coefficients at the quantizer 13 is carried out based on the fixed Qp. Further, in accordance with the invention, the statistical coder 18 provides a bit counter 20 with quantization-dependent data, i.e., statistically coded transform coefficients, and supplementary quantization-independent data including statistically coded motion vector information, prediction mode signal and other control bits such as start codes, sequence header, etc. Among the output from the statistical coder 18, such statistically coded data related to a macroblock as statistically coded transform coefficients, motion vector information, prediction mode signal and control bits for the macroblock including coded-block-pattern, etc is transmitted to the bit counter 20 on a macroblock-by-macroblock basis.

Figure 3:
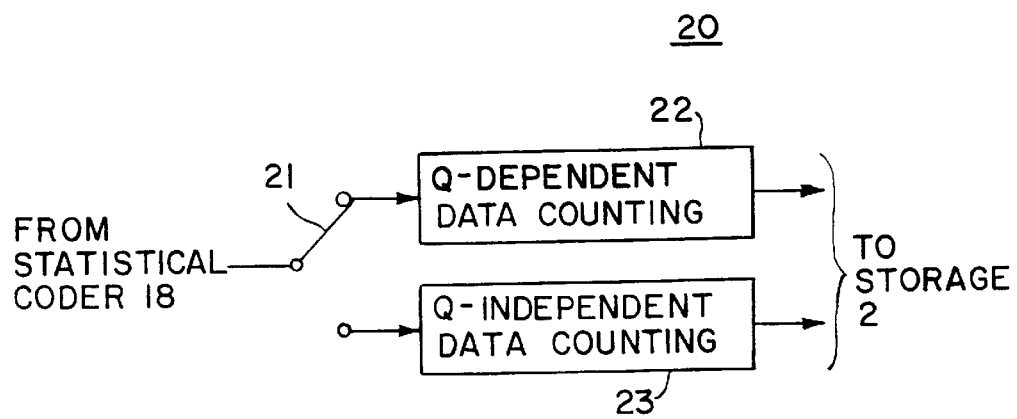
FIG. 3 represents a block diagram of a bit counter shown in FIG. 2.

Referring to FIG. 3, there is illustrated a detailed block diagram of the bit counter 20 which includes a switch 21, a quantization(Q)-dependent data counting circuit 22 and a quantization(Q)-independent data counting circuit 23. The switch 21 identifies the quantization-dependent data and the quantization-independent data among the input thereto and provides the former and the latter to the Q-dependent data counting circuit 22 and the Q-independent data counting circuit 23, respectively. At the counting circuit 22 and 23, amounts of the respective inputs thereto are counted.

The respective amounts of quantization-dependent and quantization-independent data obtained by the bit counter 20 are fed to the storage 2 shown in FIG. 1 and stored therein as bit distribution information. The storage 2 may be implemented by a hard dick or any other high speed storage medium.

The amount of data generated for each macroblock can be stored as it is or divided by a predetermined number, e.g., 256, to lower the precision before being stored. Still further, assuming that the amount of data generated for the whole picture is represented by $2^N$, the amount of data generated for each macroblock can be normalized with $2^N$ for being stored, N being a positive number. Normalization gives rise to certain advantages in calculating ratios for a given target amount of bits at the second encoder 4 shown in FIG. 1 because denominators can be bit shift operated.

In the preferred embodiment given herein, $2^N$ is assumed to be $2^{11}$, which is 2048.

The amount of data generated for each macroblock is represented in 5 bits, that is, with values 0 to 31. Since the information needed is a sum of the amounts of data generated for macroblocks, added sequentially in an encoding order, if the amount of data generated for a macroblock is greater than 31/2048, the maximum value 31 is stored for that macroblock and the remainder is added to the amount of data generated for a next macroblock thereof. The amount of data generated for each macroblock is stored separately by the amount of quantization-dependent data and the quantization-independent data.

Similarly, the amount of code generated for each picture can be store as it is, without alteration, or divided by a predetermined number, e.g., $2^8(=256)$, to lower the precision before being stored. In such an instant, assuming that the maximum total amount of data generated for a picture is 1 Mb requiring 20 bit for storage, only 12 bits are needed for storing the amount of data with a lower accuracy by 8 bits. Similarly as in the case of macroblocks, the amounts of quantization-dependent and quantization-independent data for each picture are stored separately.

When the stored data for each picture is the normalized data, the amount of data generated for each picture has to be stored as well. In other instances, the amount of data for a picture need not be stored, since same can be computed by summing the amounts of data for the blocks within the picture.

Figure 4:
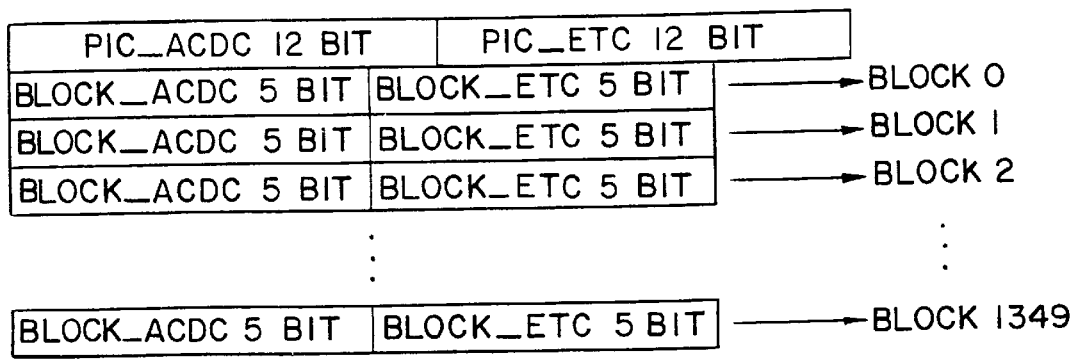
FIG. 4 exemplifies a storing format of data taken by the first encoder shown in FIG. 2.

Referring to FIG. 4, the storage format of the amount of data generated is illustrated. First, the amount of quantization-dependent data("PIC-ACDC") and the amount of quantization-independent data("PIC-ETC) for each picture are stored in 12 bits, respectively. Stored thereafter in 5 bits each are the amount of quantization-dependent data ("BLOCK_ACDC") and the amount of quantization-independent data("BLOCK_ETC") for each of the, e.g., 1350, blocks included in the picture.

Figure 5:
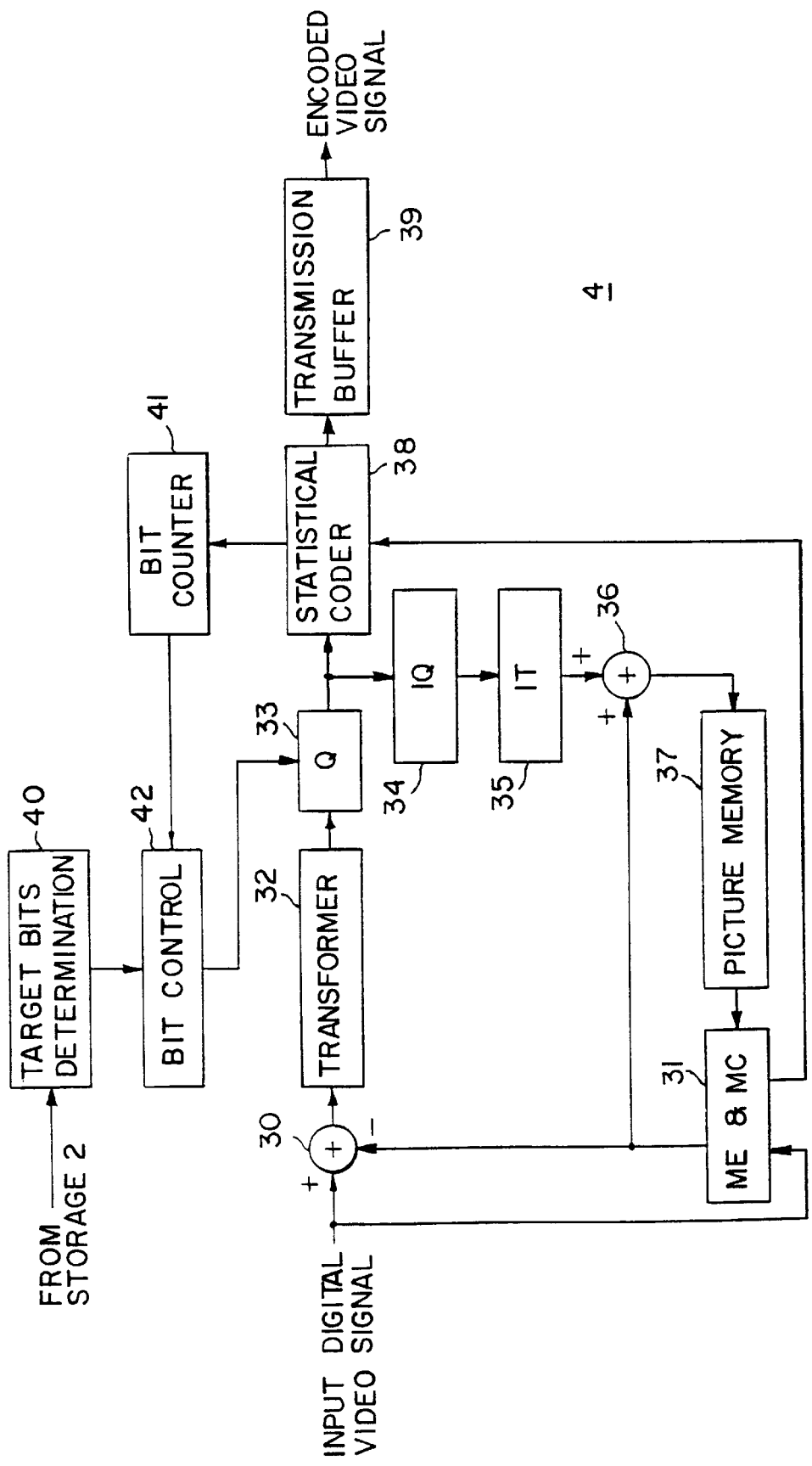
FIG. 5 illustrates a block diagram of a second encoder shown in FIG. 1.
Figure 7A:
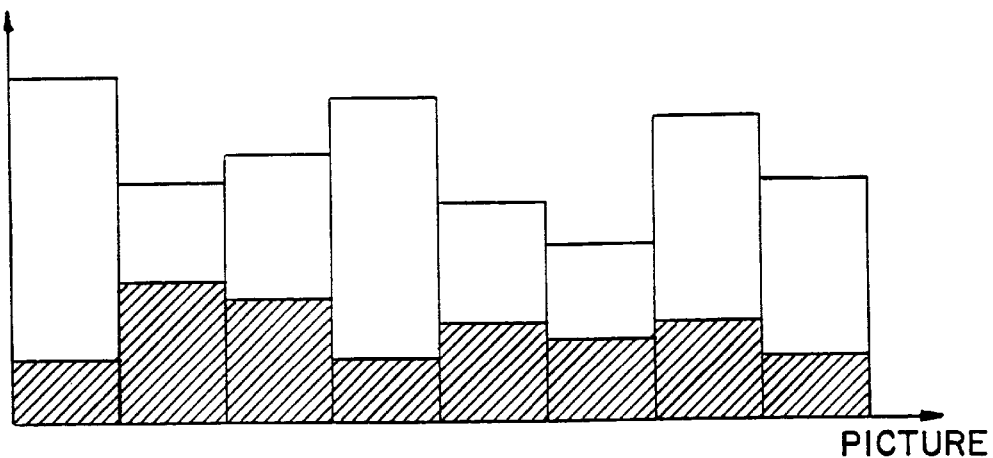
FIGS. 7A and 7B provide exemplary relationship between quantization-dependent data and quantization-independent data of pictures before and after the bit allocation therebetween, respectively.
Figure 7B:
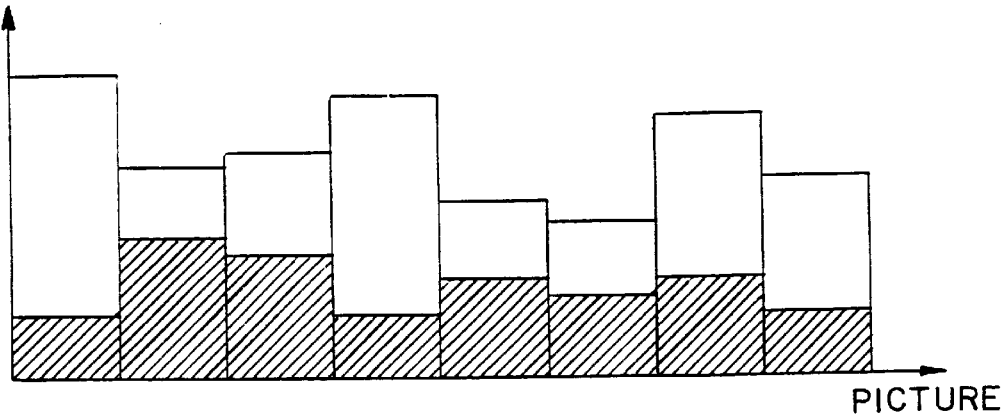
Figure 8A:
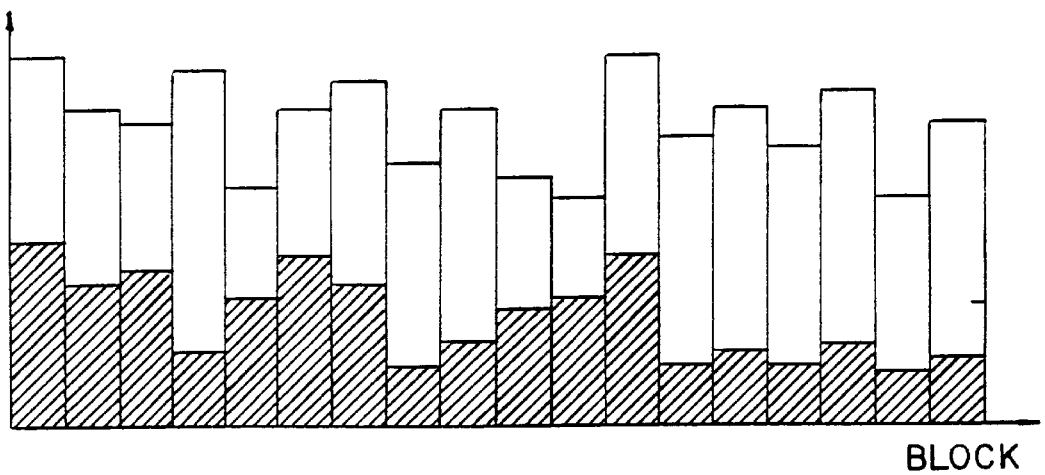
FIGS. 8A and 8B give exemplary relationship between quantization-dependent and quantization-independent data of blocks before and after the bit allocation therebetween, respectively.
Figure 8B:
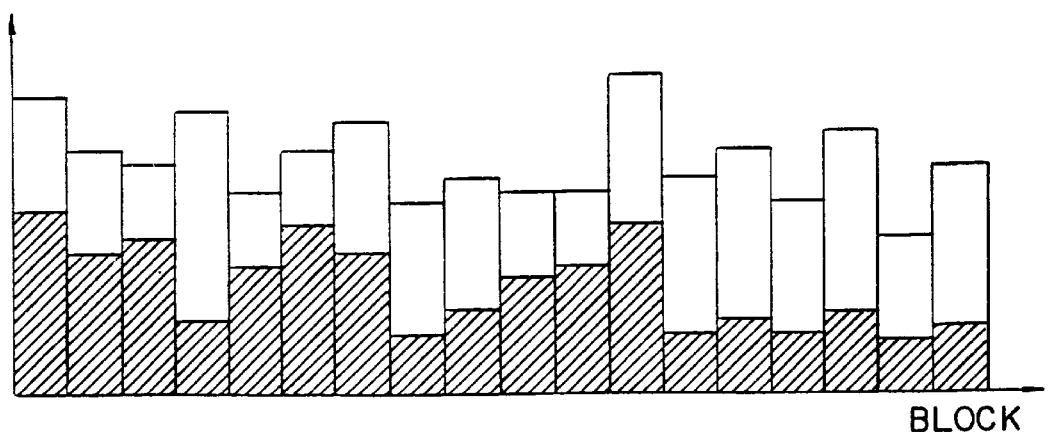

Referring to FIG. 5, there is illustrated a detailed block diagram of the second encoder 4 shown in FIG. 1. The functions and features of a subtractor 30, a motion estimation and compensation(ME & MC) circuit 31, a transformer 32, a quantizer(Q) 33, an inverse-quantizer(IQ) 34, an inverse transformer(IT) 35, an adder 36, a picture memory 37, a statistical coder 38 included in the second encoder 4 are identical to those of their counterparts of the first encoder 1 shown in FIG. 2; and, accordingly, details thereof will not be described for the sake of simplicity.

In accordance with the present invention, the second encoder 4 further includes a target bits determination circuits 40 for determining a target amount of encoded bits for each of the pictures and the macroblocks based on the target bit rate and the bit distribution information stored at the storage 2 shown in FIG. 1; a bit counter 41 for counting the amount of statistically coded data from the statistical coder 38; a quantizer(Q) 33; and a transmission buffer 39. The bit control circuit 42 calculates the error between a target amount of encoded bits and an amount of encoded data from the bit counter 41 for each of the pictures and the macroblocks and adjusts based thereon the Qp's to alter Qs's at the quantizer 33, thereby controlling the amount of encoded bits generated according to the target amount of encoded bits.

An algorithm of the preferred embodiment for determining target amounts of bits at the target bits determination block 40 will be described hereinafter. The bit distribution information generated by the first encoder 1 based on the fixed Qp, Qfix, is stored at the storage 2 shown in FIG. 1 in the forms of PIC_ACDC, PIC_ETC, BLOCK_ACDC and BLOCK_ETC. The Qfix is preferably set to be a minimum Qp, i.e., "1", which is not greater than any possible Qp's to be used at the second encoder in order to accurately estimate the complexity of the video signal and motion compensation errors.

In order to determine a target amount of encoded bits for a picture, a target amount of encoded bits for each predetermined set of pictures, e.g., a GOP, is determined first. The target amount for each set can be computed based on the target bit rate and a ratio between the number of pictures in a set and a picture rate of the video signal.

The target amount of encoded bits for a set of pictures, TARGET_BUDGET, is distributed among the pictures in the set based on the bit distribution information for the pictures. Among the bit distribution information for the set, PIC_ETC's are quantization-independent. Therefore, a target amount of quantization-dependent encoded bits for the set, ACDC_TARGET_BUDGET, is determined by:

$$ACDC\_TARGET\_BUDGET = TARGET\_BUDGET - PETC(i) \quad \text{Eq. 1}$$

wherein PECT(i) represents a value of PIC_ETC for an i-th picture in the set, i being 1 to I with I being the number of pictures in the set.

The ACDC_TARGET_BUDGET is then allocated for each picture in the set based on the ratio of a value of PIC_ACDC for a picture to those for the set, defined as:

$$PIC\_ACDC\_TARGET\_BUDGET(i)(j) = ACDC\_TARGET\_BUDGET(i) \times PACDC(j)/\Sigma PACDC(i) \quad \text{Eq. 2}$$

wherein PIC_ACDC_TARGET(i) represents a target amount of quantization-dependent encoded bits for an i-th picture and PACDC(i) denotes a value of PIC_ACDC for the i-th picture.

Finally, a target amount of encoded bits for a picture can be obtained by adding an amount of quantization-independent data and the target amount of quantization-dependent encoded bits, defined as:

$$PIC\_TARGET\_BUDGET(i) = PIC\_ACDC\_TARGET\_BUDGET(i) + PETC(i) \quad \text{Eq. 3}$$

wherein the PIC_TARGET_BUDGET(i) represents a target amount of encoded bits for an i-th picture.

Similarly, the target amount of quantization-dependent encoded bits for the i-th picture, PIC_ACDC_TARGET_BUDGET(i), is distributed for each macroblock within the picture according to a ratio of a value of BLOCK_ACDC for each block as follows:

$$BLOCK\_ACDC\_TARGET\_BUDGET(i)(j) = PIC\_ACDC\_TARGET\_BUDGET(i) \times BACDC(j)/2048 \quad \text{Eq. 4}$$

wherein BLOCK_ACDC_TARGET_BUDGET(i)(j) represents a target amount of quantization-dependent encoded bits for a j-th macroblock of the i-th picture and the BACDC(j) is a value of BLOCK-ACDC of the j-th block of the i-th picture, j being 1 to J with J being the number of the blocks within the i-th picture.

A target amount of quantization-independent encoded bits for the j-th block of the i-th picture, BLOCK_ETC_TARGET_BUDGET(i)(j), can be computed by:

$$BLOCK\_ETC\_TARGET\_BUDGET(i)(j) = PETC(i) \times BETC(j)/2048 \quad \text{Eq. 5}$$

wherein BETC(j) is value of BLOCK-ETC of the j-th block in the i-th picture.

Finally, a target amount of encoded bits for the j-th block in the i-th picture can be calculated as:

$$BLOCK\_TARGET\_BUDGET(i)(j) = BLOCK\_ACDC\_TARGET\_BUDGET(i)(j) + BLOCK\_ETC\_TARGET\_BUDGET(i)(j) \quad \text{Eq. 6.}$$

A bit control algorithm carried out at the bit control circuit 42 shown in FIG. 5 is as follows: In order to control an amount of actually generated encoded data for the i-th picture according to the target amount of encoded bits, i.e., PIC_TARGET_BUDGET(i), a Qp for a current macroblock of the picture is determined by the feedback of an error or a difference between a sum of amounts of encoded data actually generated from previously encoded macroblocks and a sum of target amounts of encoded bits thereof. A different d(j) for the j-th macroblock of i-th picture is defined as:

$$d(j) = d(0) + Bits(j-1) - TGT(j-1) \quad \text{Eq. 7}$$

wherein d(0) is an initial occupancy of a hypothetical buffer; Bits(j−1), a sum of a amounts of encoded data actually generated from the 1st to (j−1)th macroblocks of the picture; and TGT(j−1), a sum of target amounts of encoded bits BLOCK_TARGET_BUDGET(i)(j) for the 1st to (j−1)th blocks in the i-th picture.

For the first macroblocks in a picture, Bits(j−1) and TGT(j−1) are set to zeros, respectively, and, therefore, d(1) equals to d(0).

A Qp for the j-th macroblock, Q(j), is defined as:

$$Q(j) = d(j) \times 31/r \quad \text{Eq. 8}$$

wherein r is a parameter determining a response speed of the feedback.

The parameter r is proportional to a bit rate/picture rate; and is defined as:

$$r = 2 \times Bit\_rate/picture\_rate \quad \text{Eq. 9}$$

wherein Bit_rate is the target number of encoded data per second, i.e., target bit rate and the picture_rate is the number of input pictures per second.

An initial Qp, Q(0), determining the initial occupancy of the hypothetical buffer d(0) is computed based on the inverse proportionality between a Qp and an amount of data generated. Q(0) can be defined as:

$$Q(0) = Qfix \times PACDC/PIC\_ACDC\_TARGET\_BUDGET(i) \quad \text{Eq. 10}$$

and d(0) is defined as:

$$d(0) = Q(0) \times r/31 \quad \text{Eq. 11}$$

wherein the meanings of Qfix, PACDC, PIC_ACDC_TARGET_BUDGET(i) are same as above.

A Qp determined for each macroblock in a manner described above is fed to the quantizer 33, which quantizes transform coefficients for each macroblock from the transformer 32 based on quantization step size(s) determined by the Qp. The quantized coefficients are fed to the IQ 34 and the statistical coder 38. At the statistical coder 38, the quantized coefficients and the outputs from the ME & MC circuit 31 are encoded, e.g., by using the VLC technique. The encoded data from the statistical coder 38 is provided to the bit counter 41 and the transmission buffer 39, wherein the encoded data of an irregular bit rate is temporally stored therein and transmitted as the encoded video signal at a constant bit rate to a transmitter(not shown) for the transmission thereof.

Referring to FIG. 6, there is illustrated a block diagram of a video signal encoding apparatus 6 in accordance with the second embodiment of the invention. The second embodiment apparatus 6 is implemented by sharing the common parts of the first encoder 1 shown in FIG. 2 and the second encoder 4 shown in FIG. 5 of the first embodiment. The shared parts correspond to the components identified by the numerals 50 to 58 and 62 of the apparatus 6 shown in FIG. 6, and, therefore, details thereof would not be repeated for the sake of simplicity.

Also, a transmission buffer 59, a target bits determination circuit 67, and a bit control circuit 68 of the apparatus 6 are identical to those included in the second encoder 4 shown in FIG. 5; and a storage 69 functions in a similar manner as in the case of the storage 2 of the first embodiment. The apparatus 6 further includes a path control circuit 60, switches 63 to 65, a Qfix generation circuit 61 and a data memory 66. The path control circuit 60 issues a switching control signal to the switches 63 to 65. By switching each of the switches 63 to 65 to terminal a or b thereof with the aid of the switching control signal, the apparatus 6 functions in an identical fashion as in the first encoder 1 or the second encoder 4 of the first embodiment apparatus, respectively.

The Qfix generation circuit 61 provides the predetermined fixed Qp, Qfix, to the quantizer 53 via the switch 65. The data memory 66, which has a larger capacity than the storage 69, retrieves from the storage 69 and stores therein the stored data at the storage 69.

In order to encode the input digital video signal in accordance with the second embodiment of the invention, first, the path control circuit 60 issues a first switching control signal to the respective switches 63 to 65. In response thereto, each of the switches 63 to 65 is switched to the terminal a thereof, the terminal a of the switch 64 being a null or open terminal, thereby enabling an output terminal of the bit counter 62 to couple to the storage 69 via a switch 63 and transform coefficients to be quantized at the quantizer 53 by the Qs's determined based on the Qfix fed from the Qfix generation circuit 61 via the switch 65.

The input video signal is encoded in an identical fashion as in the first encoder 1 described with respect to FIG. 2; and the quantization-dependent encoded transform coefficient data and the quantization-independent data such as the motion vector(s) and the prediction-mode signal are provided on a macroblock-by-macroblock from the statistical coder 58 to the bit counter 62.

At the bit counter 62, the amounts of the respective quantization-dependent and quantization-independent data are counted and provided to the storage 69 and stored therein as the bit distribution information. The bit distribution information stored at the storage 69 is then stored at the data memory 66. During the bit distribution information acquisition process, the encoded data obtained by the statistical coder 58 is not supplied to the transmission buffer 59.

Upon completing the acquisition of the bit distribution information for the predetermined set of pictures, a bit allocation precess is initiated by generating a second switching signal from the path control circuit 60. In response to the second switching signal, each of the switches 63 to 65, changes its connection terminal from a to b. By the switching operation, the bit counter 62, the bit control circuit 68 and the storage 69 are coupled to the bit control circuit 68, the quantizer 53 and the target bits determination circuit 67, respectively, rendering the configuration of the apparatus 6 to be identical to that of the second encoder 4 shown in FIG. 5, and enabling the adaptive quantization process to be carried our at the quantizer 53 based on the Qp's determined by the bit control circuit 68.

In the course of encoding the video signal by the adaptive quantization process, inputted to the apparatus 6 is an identical input digital video signal to the one used during the bit distribution information acquisition process. The input digital video signal can be provided from a storage medium (not shown) such as an input buffer or a magnetic tape installed in a VTR(video tape recorder). For instance, if the tape is used as the storage medium, the tape is rewound by the VCR upon the completion of the bit distributive information acquisition process and the identical input digital video signal is provided to the apparatus 6 by the playback thereof.

Thereafter, the encoding process is carried out in an identical manner as in the second encoder 4 described with respect to FIG. 5.

While the present invention has been described with respect to the preferred embodiments, other modifications and variations my be made without departing from the scope and spirit of the present invention as set forth in the following claims.

What is claimed is:

1. A method for encoding a video signal including a quantization-dependent signal and a quantization-independent signal, comprising the steps of:

(a) quantizing the quantization-dependent signal base on a fixed quantization parameter to thereby generate first quantized data;

(b) statistically coding the first quantized data and the quantization-independent signal to thereby provide first data and second data, respectively;

(c) storing the amount of the first data and the amount of the second data;

(d) determining a target amount of encoded bits for each of predetermined units of the video signal based on a predetermined target bit rate and the stored amounts of the first and the second data;

(e) deciding one or more quantization parameters for each unit based on the target amount of encoded bits;

(f) quantizing the quantization-dependent data based on the decided quantization parameters to thereby generate second quantized data; and (g) statistically coding the second quantized data and the quantization-independent signal to thereby generate third data and fourth data, respectively, as the encoded data of the video signal, wherein the quantization parameters are adaptively decided in response to the difference between the target amount of encoded bits and the amount of the encoded data.

2. The method according to claim 1, wherein each unit corresponds to a picture of the video signal.

3. The method according to claim 1, wherein each unit corresponds to a macroblock of the video signal.

4. The method according to claim 1, wherein the target amount of encoded bits is determined for each picture and macroblock of the video signal.

5. The method according to claim 1, wherein said determining step (d) includes the steps of:

(d1) computing a target amount of encoded bits for a predetermined set of pictures based on the target bit rate, the number of pictures in the set, and a picture-rate of the video signal;

(d2) detecting a target amount of quantization-dependent encoded bits for the set by subtracting the amount of the second data corresponding to the set from the target amount of encoded bits for the set;

(d3) finding a ratio of an amount of the first data corresponding to each picture in the set with respect to an amount of the first data corresponding to the set;

(d4) multiplying the target amount of quantization-dependent encoded bits for the set by the ratio found in step (d3) to thereby obtain a target amount of quantization-dependent encoded bits for each picture; and (d5) determining a target amount of encoded bits for each picture by adding the target amount of the quantization-dependent encoded bits obtained in step (d4) and an amount of the second data corresponding to each picture.

6. The method according to claim 5, wherein said determining step (d) further includes the steps of:

(d6) calculating a ratio of an amount of the first data corresponding to each macroblock in a picture with respect to an amount of the first data for the picture;

(d7) multiplying a target amount of quantization-dependent encoded bits for the picture obtained in step (d4) by the ratio calculated in step (d6) to thereby provide a target amount of quantization-dependent encoded bits for each macroblock; and (d8) determining a target amount of encoded bits for each macroblock by adding the target amount of quantization-dependent encoded bits provided in step (d7) and an amount of second data for each macroblock.

7. The method according to claim 5, wherein the amount of second data corresponding to each picture is calculated by summing respective amounts of second data for macroblocks included in each picture and the amount of first data corresponding to each picture is generated by summing respective amounts of first data for the macroblock in each picture.

8. An apparatus for encoding a video signal including a quantization-dependent signal and a quantization-independent signal, comprising:

first encoding means having:
 a first quantization means for quantizing the quantization-dependent signal based on a fixed quantization parameter to thereby generate first quantized data,
 a first statistical coder for coding the first quantized data and the quantization-independent signal to thereby provide first data and second data, respectively, and
 a first counting means for finding the amount of the first data and the amount of the second data;

means for storing the respective amounts of the first and the second data; and a second encoding means having:
 means for determining a target amount of encoded bits for each of predetermined units of the video signal,
 means for deriving one or more quantization parameter for each unit based on the target amount of encoded bits,
 a second quantization means for quantizing the quantization-dependent signal based on the decided quantization parameters to thereby generate second quantized data,
 a second statistical coder for coding the second quantized data and the quantization-independent signal to thereby generate third data and fourth data, respectively, as encoded data of the video signal, and
 a second counting means for determining the amount of the third data and the amount of the fourth data.

9. The apparatus according to claim 8, wherein said quantization parameter deriving means includes;
 means for detecting the difference between the target amount of encoded bits and an amount of encoded data; and
 means for adaptively adjusting the quantization parameters in response to the difference.

10. The apparatus according to claim 8, wherein each unit corresponds to a picture of the video signal.

11. The apparatus according to claim 8, wherein each unit corresponds to a macroblock of the video signal.

12. The apparatus according to claim 8, wherein the target amount of encoded bits is determined for each picture and macroblock of the video signal.

13. The apparatus according to claim 8, wherein the amounts of the first and the second data are stored for each picture and macroblock of the video signal.

14. The apparatus according to one of claims 8, further comprising a delay means for delaying the video signal until the amounts of the first and the second data are stored in the storing means and applying the video signal to the second encoding means thereafter.

15. An apparatus for encoding a video signal which includes a quantization-dependent signal and a quantization-independent signal, comprising:

means for quantizing the quantization-dependent signal to thereby provide first quantized data;

means for statistically coding the first quantized data and the quantization-independent signal, thereby generating first data and second data, respectively;

a counting means for obtaining the amount of the first data and the amount of the second data;

means for storing the amount of the first data and the amount of the second data;

a target bits determination means for determining a target amount of encoded bits for each of predetermined units of video signal based on a target bit rate and the stored amounts of the first and the second data;

a bit control means for deciding an initial quantization parameter based on the target amount of encoded bits and deciding further quantization parameters based on a difference between the target amount of encoded bits and the amount of the encoded data generated by the statistically coding means to thereby generate decided quantization parameters;

means for setting a fixed quantization parameter; and controlling means for coupling the fixed quantization parameter to the quantizing means and inputting the amounts of first and second data to the storing means and, thereafter, providing the stored amounts of first and second data, the outputs of the counting means and the decided quantization parameters to the target bits determination means, the bit control means and the quantizing means, respectively, thereby adaptively controlling quantization step sizes at the quantizing means.

16. The apparatus according to claim 15, wherein each unit is a picture of the video signal.

17. The apparatus according to claim 15, wherein each unit is a macroblock of the video signal.

18. The apparatus according to claim 15, wherein the target amount of encoded bits is determined for each picture and macroblock of the video signal.

* * * * *